July 1, 1969  W. SCHULTZ ET AL  3,452,660
SERIES FLASH DEVICE

Filed Oct. 3, 1966  Sheet 1 of 2

INVENTORS
Werner Schultz
Wolfgang Bemerl

By Howard P. King
ATTORNEY

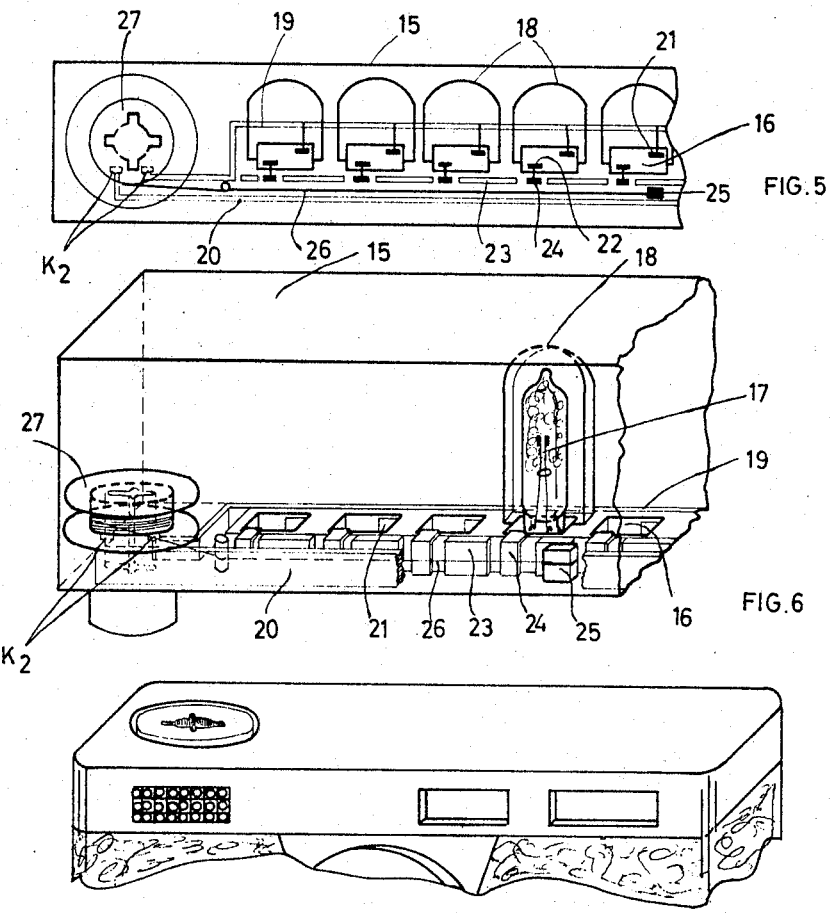

United States Patent Office 3,452,660
Patented July 1, 1969

3,452,660
SERIES FLASH DEVICE
Werner Schultz and Wolfgang Bemerl, Munich, Germany, assignors to Patent-Treuhand-Gesellschaft fur Elektrishe Gluhlampen mbH, Munich, Germany, a corporation of Germany
Filed Oct. 3, 1966, Ser. No. 583,819
Claims priority, application Germany, Oct. 15, 1965, P 26,095
Int. Cl. G03b 9/70
U.S. Cl. 95—11.5        5 Claims

ABSTRACT OF THE DISCLOSURE

A flash attachment for a photographic camera having a casing which is detachably connected to a camera, a series of flash-lamps mounted in the casing, a mechanism within the casing for sequentially moving the flash-lamps into firing position, and a spindle protruding from the casing. The camera has a flash-lamp rotor which rotates by a predetermined amount after each picture-taking operation of the camera. The spindle of the casing engages the flash lamp rotor of the camera and transmits the rotary motion of the rotor to the mechanism in the casing. The casing also has a member for preventing it from rotating when it is attached to the camera.

Figure 1:
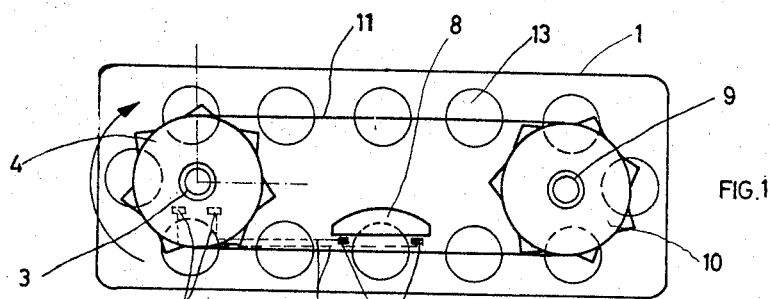

According to the prior art, there is a camera which is provided with an annular groove wherein a coaxially located rotor is pivotally mounted which automatically turns 90° after each picture exposure or shot by the camera. Carried in and protruding from said groove is a cubical body, namely, a so-called "flash-cube," the four side faces of which are parallel to the axis of rotation and constitute light-exit faces each for one of four photoflash lamps within the flash-cube. Appropriate contacts are provided for successive flashing of the lamps as the camera takes a picture. While this device had advantage over hitherto used single-shot flash devices and over manually operated magazine flash devices, it presents the drawback that four shots only are available before reloading, whereas the film used in the camera provides for a greater number of shots or exposures.

Therefore, it is an object of the invention to provide a series flash device cooperative with the aforementioned receiving groove and rotor of the prior art camera, said device providing for a succession, in quick sequence if desired, of more than four shots one after another.

Another object of the invention is to provide a non-rotatable casing for attachment to a camera and protectively include in said casing moving mechanism actuated by the rotatable rotor of the camera for successively igniting flash-lamps in prearranged flashing position.

In its broadest aspect, the invention provides for a series of flash-lamps commensurate in number to the number of picture areas of the film used in the camera; for instance, for use with a twelve-picture film roll, the invention provides twelve flash-lamps for successive use each with the taking of a picture. The invention is constructed and arranged to function with a camera of known construction as to which it will suffice to say that the camera is one having intermittent predetermined rotation of a rotor and has fixed contact electrical terminals available to the flash device when mounted in place on the camera. The said device has a fixed casing, and a spindle projects from the casing into operative engagement with said rotor so as to be rotated thereby. Within the casing, the spindle has a drum fixed thereon and associated with said drum is means, described in detail herebelow, which will connect the flash-lamps successively to be energized from said terminals.

In one example of embodiment of the invention, an endless belt is provided for actuation by said drum and the series of flash-lamps carried thereby will be advanced successively to an igniting position between and proximate to a window and a reflector and with the electrical contacts of the one lamp in that attained position then making electrical connection with said fixed terminals of the camera, ready for activation as the picture is snapped.

In another embodiment of the invention, the lamps are fixed and each is located between a window and a reflector individual thereto. In this arrangement, a flexible pull element, such as a thread or the like, is wound up by the drum, and at each quarter turn of the drum advances a metallic slider to complete an electric circuit from the aforesaid terminals to the next successive lamp.

While certain embodiments are referred to above, and will be more specifically described in the following specification, it is to be understood that the invention is not confined to the arbitrarily selected details in the pictorial disclosure. For instance, the casing, with its reflector or reflectors may be constructed as a pack to be thrown away after use, or may be constructed to be retained after use and reloaded for subsequent use. Furthermore, if to be used with the type of flash-lamp provided with individual reflectors, the casing may then be made without built-in reflectors. Also, the casing, at least at its front, may be translucent and thus function in its entirety as a flash-light emitting window.

Figure 2:
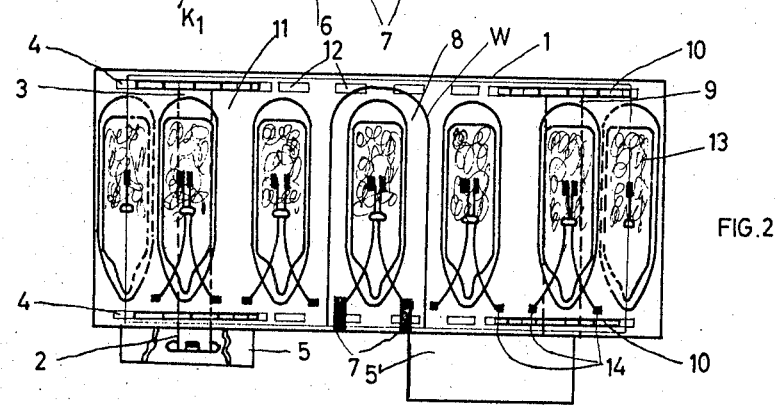
Figure 3:
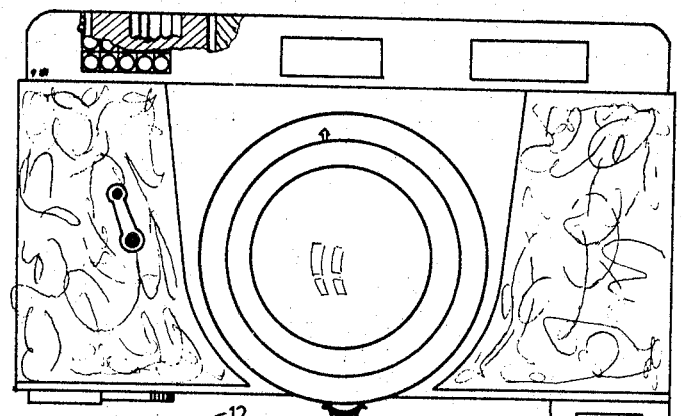
Figure 4:
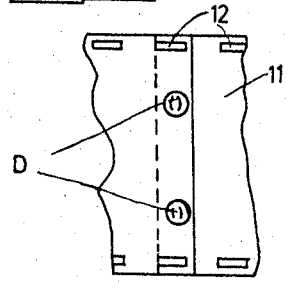

In the drawings:
FIGURE 1 is a plan view of a series flash device according to the invention;
FIGURE 2 is a front elevation of the device of FIG. 1, with the front wall of the casing representative of a transparent closure;
FIGURE 3 is a front elevation of a camera with which the present invention is adapted to be used;
FIGURE 4 shows in elevation the overlapping ends of the flexible belt connected by snap fasteners;
FIGURE 5 is a plan of a second example of construction of the invention, looking at the same toward the top thereof and considering the casing transparent;
FIGURE 6 is a perspective view of the said second example construction of the invention; and
FIGURE 7 is a perspective view of a portion of a camera with which the invention is adapted for use.

In the specific embodiment of the invention illustrated in said drawings, and giving attention initially to the construction depicted by FIGS. 1–4, a casing 1 for mounting on a rotor-equipped camera such as presently on the market for the so-called flash-cube attachments, is provided as a protective enclosure for a plurality of flash-lamps here designated by numeral 13. Near one end of said casing a spindle 2, as an extension of a shaft 3, depends below the casing for introduction into and actuation by the camera. Next to the bottom of said spindle the same is constructed, as by laterally projecting pins to interengage with the rotor of the camera. Upright within the casing, as a continuation of said spindle, there is a shaft 3 having upper and lower sprockets 4 secured thereon to rotate therewith. The shaft and its sprockets are in effect a rotatable drum.

Coaxial with said spindle, and also depending from said casing, is an annular collar 5 adapted to fit into the corresponding annular groove present in the top of the prior art camera, and in that assembly the spindle will then engage with the rotor of the camera and receive a quarter turn therefrom after each exposure or snapping of a picture. Appropriately located, preferably within said collar and supported therefrom, are two electrical terminal contacts K₁ insulated from each other and properly constructed and located for engaging electrical outlet terminals (not shown) with which the camera is equipped. Electrical leads 6 individual to each of said terminal contacts K₁ extend within the casing to respective spring contacts 7 next to the bottom and front of the casing at a location herein termed, for convenience, the flashing station, at which place the casing, if not otherwise transparent, is of course provided with an appropriate window indicated at W in FIG. 2.

Rotatably mounted at its top and bottom ends in the top and bottom walls of said casing, at a location remote from the above-mentioned spindle 2 and shaft 3, and parallel thereto, is a free-rotating shaft 9 which has sprocket wheels 10 fixed thereon. The respective top and bottom sprocket wheels of the two shafts 3 and 9 are in common planes parallel to each other. Extending around said sprocket wheels is a belt 11 the ends whereof overlap and are secured to each other, as by snap-fasteners D, whereby the belt is in effect endless after being applied to the sprocket wheels. Said belt may appropriately be made of translucent plastics material. Longitudinally of the belt proximate to the upper and lower edges thereof are parallel series of perforations 12 spaced appropriately to cooperate with the sprocket projections or teeth for advancement of the belt with each turn imparted from the camera on the spindle 2 and shaft 3.

The belt 11 carries a plurality of successive flashlamps 13 appropriately spaced one from another such that with each actuation of the belt by the sprocket wheels, a new lamp is brought into position at the aforesaid flashing station. At said station, there is a reflector 8 behind the position of the flash-lamp and behind the forward reach of the belt near the front of the casing. The lead-in wires for each lamp are connected to metallic contacts 14, one for each wire, carried at a fixed distance from the bottom of the belt and at a level such that they will ride into wiping engagement with afore-mentioned spring contacts 7 at the flashing station and complete electric circuit from said spring contacts to the lamp filament as a lamp arrives at said flashing station.

In use, the belt 11 is applied to the sprocket wheels and its ends secured together by snap-fasteners D or the like, making sure that one of the lamps, preassembled on the belt, is at the flashing station with its metallic contacts 14 in engagement with the fixed spring contacts 7. Thereafter, as the camera is operated to open its shutter and take a picture, the automatic closing of an internal electric circuit supplies igniting current through terminal contcats K₁ and thence to the spring contacts 7 of the presently described device with the current passing to the metallic contacts 14 on the belt and to the filament of the lamp at the flashing station. Then, a prior-art mechanism present in the well-known camera with which the device is used, instigates a quarter-turn or other predetermined degree of rotation of spindle 2 and the shaft 3 and advances the belt 11 to position a fresh lamp at the flashing station. It may be here mentioned, that the casing is prevented from rotation by suitable anchoring means, such as a fixed camera-engaging projection 5' at the bottom of the casing at a location remote from spindle 2.

As shown in the second example, FIGS. 5–7 of the drawings, the flash-device casing 15, which may be translucent, has a plurality of fixed receptacles 16 for receiving photoflash lamps 17. A reflector 18 may be associated with each receptacle for lamps not equipped with individual reflectors. Terminal contacts K₂ corresponding to previously described terminal contacts K₁ for engagement with the camera electrical terminals, are connected to bus-leads 19 and 20 extending along the casing to the successive receptacles. Each receptacle 16 contains two contacts 21, 22. A respective contact 21 of each receptacle is in permanent connection with one bus-conductor 19. The second bus-conductor 20 is constructed as a rail to which another rail 23 of insulative material runs in parallelism thereto. At regular intervals along and embedded in said insulative rail are electric rail contacts 24, contact areas whereof are exposed at and flush with a face of the said insulative rail. Each of these rail contacts 24 is connected with a respective receptacle second contact 22. Between the two said rails 20, 23 there is a metallic shoe or contact slider 25 in constant engagement with both rails and, when slid, is brought successively into engagement with the embedded rail contacts 24 of the insulative rail 23. The shoe or slider 25 is attached at one end of a flexible pull element 26, such as a thread or the like. The other end of said flexible pull element is fixed in a drum 27 which is automatically rotated by the prior art camera mechanism after each picture exposure through a predetermined angularity, for instance through 90°, thereby winding up said pull element with step-by-step advancement, and sliding the shoe or slider 25 each step of advancement from one rail contact 24 to the next. It will be understood that, as with the first example above described, the camera is one of prior art construction having the automatic rotor mechanism with which the present invention cooperates to provide in excess of four flash lamps in position for service, and in both examples to preferably provide as many flash-lamps as there are picture areas on the film pack.

If this form of the invention is made to be a rudimental flash device for repeated use by re-loading with fresh flash-lamps after one set has been used up, the pull element is unwound from the drum by pulling the slider 25 back to its starting position, the receptacles are re-loaded and the device is thus quickly made ready for re-use.

With either a throw-away device or one for re-use, a pack of flash lamps may be provided with the lamps premounted on a rigid or semi-rigid backing of plastics or other material and inserted in the casing as a unitary group. In this instance, individual receptacles 16 may be omitted and the lead-in terminal wires of the flash-lamps may be bent in well-known manner around edges or ledges of the pack backing to constitute electrical contacts. This mode of pack construction is not only conducive to ready manufacture from injection-molded synthetics, but also promotes rapid placement of a new series of lamps for a series that has been used.

We claim:

1. A series flash device which acts in conjunction with a propelled flash-lamp rotor of a camera wherein said rotor after each picture-taking shot by the camera rotates by a predetermined definite angle and wherein said camera provides an electric circuit with output terminals for activating a flash-lamp, said device comprising a casing for attachment to said camera in non-rotatable position, a spindle protruding from said casing, said spindle being rotatable with respect both to said casing and to the camera and axially aligned with and adapted to engage and be turned by said rotor, a series of flash-lamps mounted in said casing for successive activation, each said lamp having lead-ins for receiving current from said camera circuit, means in said casing movable longitudinally thereof with a step-by-step advancement, and a mechanism in said casing translating rotary motion of said spindle to a longitudinal motion by said means.

2. A series flash device in accordance with claim 1, wherein said casing provides two projections thereon for engagement with the camera, one of said projections being coaxial with said spindle and the other being remote from said spindle and preventing rotation of said casing.

3. A series flash device in accordance with claim 1, wherein terminal contacts are provided by the camera for mating with the output terminals of the camera, one each of said lamp lead-ins being connected to one of said terminal contacts, a bus-lead rail connected to the other of said terminal contacts, said rail passing proximate to without engaging said lamp lead-ins, and said mechanism providing a conductive shoe movable successively to the second one of said lamp lead-ins and electrically completing circuit thereto from said rail.

4. A series flash device in accordance with claim 3, wherein an insulative rail is provided in parallelism to said bus-lead rail, said insulative rail having rail contacts therein at intervals of one for each lamp, each rail contact connecting with the respective second one of the lamp lead-ins, and said shoe being slidable between said rails and progressively completing the circuits to the successive lamps.

5. A series flash device in accordance with claim 3, wherein said lamps are mounted on a backing as a unitary pack adapted to be thrown away when used and replaced by a fresh pack applied as a unit in said casing.

References Cited

UNITED STATES PATENTS

| | | | |
|---|---|---|---|
| 2,671,387 | 3/1954 | Knight | 95—11.5 |
| 3,238,749 | 3/1966 | Reiber et al. | 240—1.3 XR |
| 3,263,068 | 7/1966 | Jakob | 240—1.3 |
| 3,267,272 | 8/1966 | Fischer | 240—1.3 |
| 3,335,651 | 8/1967 | Williams et al. | 95—11 |

NORTON ANSHER, *Primary Examiner.*

F. L. BRAUN, *Assistant Examiner.*

U.S. Cl. X.R.

240—1.3, 37.1; 339—147

UNITED STATES PATENT OFFICE
CERTIFICATE OF CORRECTION

Patent No. 3,452,660                                                July 1, 1969

Werner Schultz et al.

It is certified that error appears in the above identified patent and that said Letters Patent are hereby corrected as shown below:

Column 4, line 70, "camera" should read -- casing --.

Signed and sealed this 11th day of August 1970.

(SEAL)
Attest:

Edward M. Fletcher, Jr.                               WILLIAM E. SCHUYLER, JR.
Attesting Officer                                                  Commissioner of Patents